UNITED STATES PATENT OFFICE.

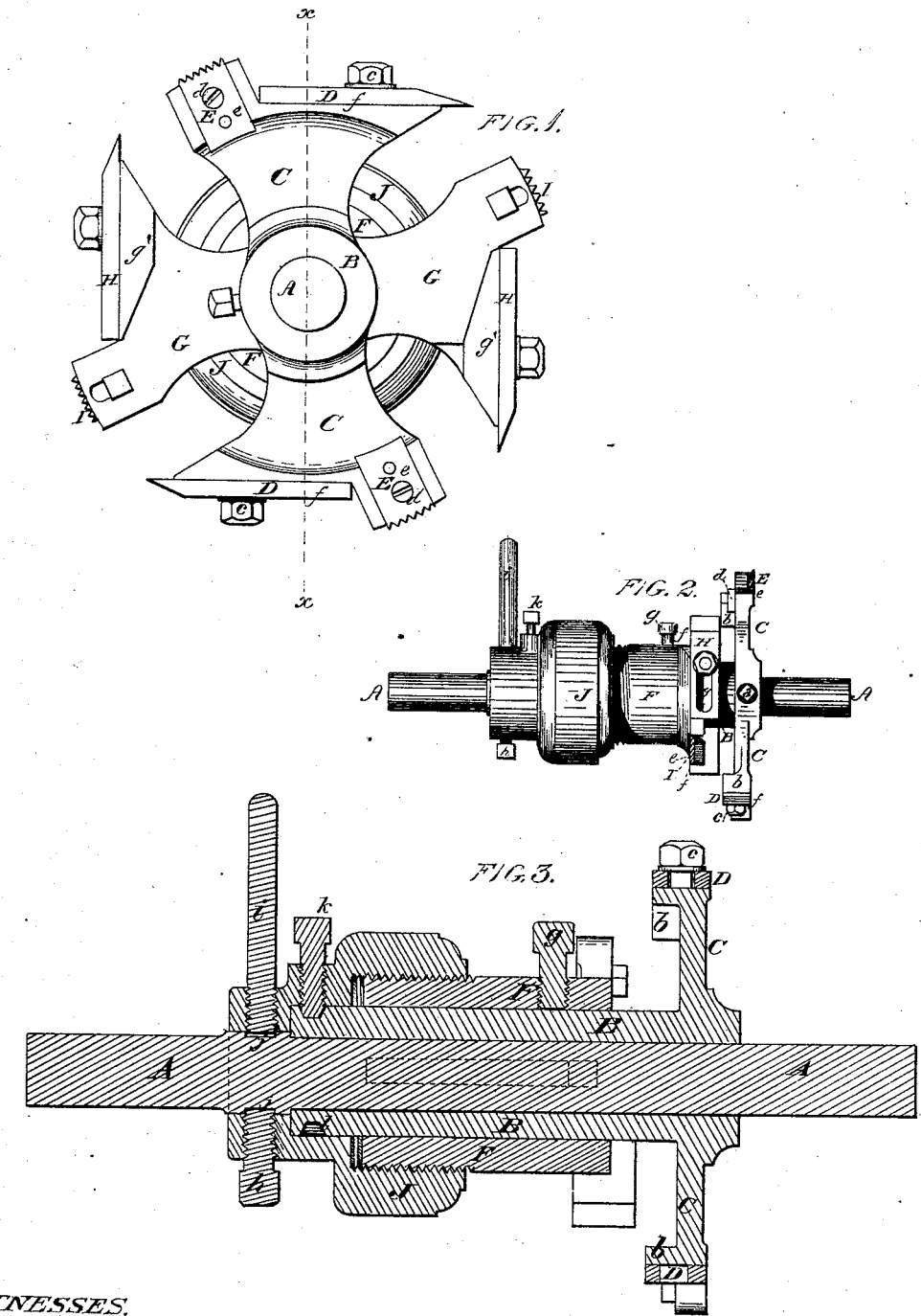

MARTIN BUCK, OF LEBANON, NEW HAMPSHIRE.

IMPROVEMENT IN CUTTER-HEADS.

Specification forming part of Letters Patent No. 162,526, dated April 27, 1875; application filed November 2, 1874.

*To all whom it may concern:*

Be it known that I, MARTIN BUCK, of Lebanon, in the county of Grafton and State of New Hampshire, have invented certain Improvements in Cutter-Heads, of which the following is a specification:

My invention relates to cutter-heads of machines for cutting grooves, slots, or mortises; and it consists in a novel construction, combination, and arrangement of parts, the object of which is to render the cutter-head readily and easily adjustable or expansible for cutting grooves, slots, or mortises of different widths, as will be fully hereafter set forth.

Figure 1 is a front view of the cutter-head. Fig. 2 is a side view of the same. Fig. 3 is a vertical longitudinal section of Fig. 1 through the line $x\,x$.

This cutter-head is constructed in two parts, each part carrying a convenient number of cutters, and one of which is stationary on the shaft while the other is adjustable to or from it by means of a swiveled nut, which receives a screw-sleeve formed on the adjustable part, so as to admit of longitudinal adjustment.

A is the shaft; B, a sleeve or hollow shaft sliding on the shaft A, and secured thereon by a set-screw. C C are arms projecting from the outer extremity of the sleeve B, at right angles therewith. $b$ is a block formed on the outward ends of these arms, to which the cutters D are secured by the screws $c$. The cutters D are slotted to allow of longitudinal adjustment. E is a scoring-cutter secured to the arm by the nut $d$. This scoring-cutter is set so that its outer side $e$ shall be in the same plane, or slightly beyond the outer edge or side $f$ of the cutters D, as shown at Fig. 2. F is a sleeve or hub sliding upon the sleeve B, and made to revolve therewith by means of a spline which connects the two, and a set-screw, $g$, which binds the sleeves together. This sleeve is provided at one end with the arms G, blocks $g'$, cutters H, and scorers I, which are all similar to, and correspond with, those on the sleeve B, before described. Only the sleeve F is so set as to bring them at right angles to those on the sleeve B, as shown at Fig. 1.

The other extremity of the sleeve F is screw-threaded, and screws into a nut, J, swiveled to the sleeve B by means of the screw $k$ and the groove $l$ turned in the sleeve B; or it may be swiveled directly to the shaft A by the screw $h$ and groove $j$.

The parts are so constructed and adjusted that when the sleeve or hub F is run into the nut to its farthest extent the inner sides of the cutters D H on the arms of each sleeve will be in the same plane; or, in other words, the distance between the outer sides of the cutters on each arm will equal the sum of the width of two cutters.

The operation of the device is as follows: The set-screw $g$ is loosened and the nut turned in either direction. This will move the cutters H toward or away from the cutters D, and consequently increase or diminish the width between their outer edges, and thus vary the width of the groove cut. When the desired width has been arrived at the screw $g$ is turned down on the sleeve B, and the head is ready for operation.

The operation of the cutters being generally well understood in the art, suffice to say here that they act to plane out the stuff while the scorers score down the sides of the groove.

I am aware of the patent granted to M. W. Clarke, July 27, 1869, No. 93,056, for improvement in cutter-heads, and understand the construction and operation of the invention therein shown and described; and I disclaim it.

What I claim is—

1. In an expansible cutter-head, the combination of the swiveled screw-nut J and screw-sleeve F, carrying the cutter-arms G, constructed and operating substantially in the manner described and specified.

2. The combination of the shaft A with sleeve B, provided with arms C, screw-sleeve F, provided with arms G, and the screw-nut J, constructed and operating substantially in the manner described and specified.

MARTIN BUCK.

Witnesses:
EDWARD J. DURANT,
G. E. DURANT.